United States Patent
Caswell

(10) Patent No.: US 8,684,327 B2
(45) Date of Patent: Apr. 1, 2014

(54) TEMPORARY SUPPORT

(75) Inventor: Tommy Caswell, Fetcham (GB)

(73) Assignee: Indian Industries, Inc., Evansville, IN (US)

( * ) Notice: Subject to any disclaimer, the term of this patent is extended or adjusted under 35 U.S.C. 154(b) by 364 days.

(21) Appl. No.: 12/812,946

(22) PCT Filed: Jan. 16, 2009

(86) PCT No.: PCT/GB2009/000112
§ 371 (c)(1),
(2), (4) Date: Sep. 16, 2010

(87) PCT Pub. No.: WO2009/090393
PCT Pub. Date: Jul. 23, 2009

(65) Prior Publication Data
US 2011/0139956 A1    Jun. 16, 2011

(30) Foreign Application Priority Data

Jan. 16, 2008  (GB) .................................. 0800703.1
Oct. 28, 2008  (GB) .................................. 0819761.8

(51) Int. Cl.
*F16M 11/32*    (2006.01)
*E04H 15/20*    (2006.01)

(52) U.S. Cl.
USPC ........................ 248/519; 248/168; 52/2.13

(58) Field of Classification Search
USPC ......... 248/519, 511, 523–525, 528–529, 170, 248/163.1, 165, 166, 168; 343/880–883; 428/36.3, 34.9, 36.1–36.2; 52/2.11, 52/2.13, 2.18–2.19, 2.22, 843, 651.01, 52/108, 2.21, 2.25–2.26; 156/149
See application file for complete search history.

(56) References Cited

U.S. PATENT DOCUMENTS

| 2,459,198 | A |   | 1/1949  | St. John |
|-----------|---|---|---------|----------|
| 2,765,014 | A | * | 10/1956 | Muller ........................... 52/2.21 |
| 2,832,555 | A | * | 4/1958  | Terhune ......................... 248/170 |
| 3,110,368 | A | * | 11/1963 | Ross ............................... 52/148 |

(Continued)

FOREIGN PATENT DOCUMENTS

| BE | 1017450 A6 | 10/2008 |
|----|-----------|---------|
| DE | 4025722 A1 | 8/1992 |

(Continued)

OTHER PUBLICATIONS

International Preliminary Report on Patentability and Written Opinion of the International Searching Authority mailed Jul. 20, 2010, issued in corresponding International Patent Application No. PCT/GB2009/000112, filed Jan. 16, 2009 (7 pages).

(Continued)

*Primary Examiner* — Terrell McKinnon
*Assistant Examiner* — Ingrid M Weinhold
(74) *Attorney, Agent, or Firm* — Woodard, Emhardt, Moriarty, McNett & Henry LLP

(57) ABSTRACT

Equipment is temporarily supported above the ground by a self-supporting, readily erectable and transportable mast. The mast comprises a pneumatically inflatable elongate tube having a first end to which the equipment is coupled and a second end coupled to a ground support tripod. The mast is provided with bracing structure adapted to brace the tube when inflated and including respective flexible members extending from each tripod leg to the first end of the tube.

20 Claims, 16 Drawing Sheets

(56) References Cited

U.S. PATENT DOCUMENTS

| | | | |
|---|---|---|---|
| 3,137,307 A | | 6/1964 | Scurlock |
| 3,156,471 A | | 11/1964 | Bibeau |
| 3,278,938 A | * | 10/1966 | Rosenthal .................... 343/880 |
| 3,364,488 A | * | 1/1968 | Perenic et al. ................ 343/723 |
| 3,484,788 A | * | 12/1969 | Bell et al. ..................... 343/880 |
| 3,608,250 A | | 9/1971 | Ducrocq |
| 3,871,607 A | * | 3/1975 | Pile .............................. 248/171 |
| 3,945,867 A | * | 3/1976 | Heller et al. .................. 156/143 |
| 4,146,897 A | * | 3/1979 | Wilson et al. ................. 343/882 |
| 4,240,603 A | * | 12/1980 | Chiariello ................... 248/125.9 |
| 4,302,266 A | * | 11/1981 | Kutnyak ....................... 156/149 |
| 4,514,447 A | * | 4/1985 | Boxmeyer ................... 428/36.3 |
| 4,662,130 A | * | 5/1987 | Miura et al. .................... 52/108 |
| 4,762,298 A | | 8/1988 | Wood |
| 4,876,829 A | | 10/1989 | Mattick |
| 5,205,086 A | | 4/1993 | Heim |
| 5,308,029 A | * | 5/1994 | Bingham ...................... 248/159 |
| 5,421,128 A | * | 6/1995 | Sharpless et al. ............. 52/2.13 |
| 5,531,419 A | * | 7/1996 | Gustafsson et al. .......... 248/519 |
| 5,546,707 A | * | 8/1996 | Caruso ........................... 52/2.13 |
| 5,677,023 A | * | 10/1997 | Brown ......................... 428/36.6 |
| 5,702,109 A | | 12/1997 | Mahin |
| 5,735,083 A | | 4/1998 | Brown |
| 5,743,049 A | | 4/1998 | Thallemer |
| 5,832,688 A | * | 11/1998 | Crissey et al. ............. 52/651.01 |
| 5,865,693 A | | 2/1999 | Johnson |
| 6,179,367 B1 | | 1/2001 | Bowen |
| 6,322,230 B1 | * | 11/2001 | Medici ............................ 362/96 |
| 6,543,730 B2 | * | 4/2003 | Pedretti ........................... 248/52 |
| 6,629,899 B2 | | 10/2003 | Chauvet et al. |
| 7,011,280 B2 | | 3/2006 | Murray et al. |
| 7,052,417 B2 | * | 5/2006 | Chen ............................. 473/479 |
| 7,062,883 B1 | * | 6/2006 | Langholz et al. ............... 52/110 |
| 7,118,487 B2 | | 10/2006 | Turcot |
| 8,141,301 B2 | * | 3/2012 | Brown ........................... 52/2.13 |
| 2004/0127309 A1 | | 7/2004 | Huang |
| 2005/0121590 A1 | * | 6/2005 | Vanover ........................ 248/519 |
| 2007/0251185 A1 | | 11/2007 | Haggard |
| 2008/0106888 A1 | * | 5/2008 | Nalitchaev et al. ............. 362/96 |
| 2009/0195475 A1 | * | 8/2009 | Ashjaee et al. ................ 343/881 |

FOREIGN PATENT DOCUMENTS

| | | |
|---|---|---|
| DE | 29502733 U1 | 4/1995 |
| DE | 102004002764 | 6/2004 |
| EP | 0 264 973 A2 | 4/1988 |
| EP | 0 270 367 A2 | 6/1988 |
| EP | 1528311 | 5/2005 |
| FR | 1382305 A | 12/1964 |
| FR | 2887523 A1 | 12/2006 |
| GB | 2 422 322 A | 7/2006 |
| GB | 2 456 424 A | 7/2009 |
| JP | 3022902 U | 4/1996 |
| JP | H10-504362 | 4/1998 |
| JP | 2003-151309 | 5/2003 |
| JP | 2005-140327 | 6/2005 |
| WO | 93/21389 A1 | 10/1993 |
| WO | WO 93/21389 | 10/1993 |
| WO | 98/30291 A1 | 7/1998 |
| WO | WO 99/47853 | 9/1999 |
| WO | 02/063207 A1 | 8/2002 |
| WO | 2009/090393 A2 | 7/2009 |

OTHER PUBLICATIONS

International Search Report mailed Feb. 3, 2010, issued in related International Application No. PCT/GB2009/002546, filed Oct. 26, 2009, 4 pages.

International Search Report mailed Oct. 29, 2009, issued in corresponding International Application No. PCT/GB2009/000112, filed Jan. 16, 2009, 4 pages.

United Kingdom Search Report mailed Feb. 16, 2010, issued in priority United Kingdom Application No. GB 0819761.8, filed Jan. 6, 2008, 1 page.

United Kingdom Search Report mailed May 7, 2009, issued in related United Kingdom Application No. GB 0900770.9, filed Jan. 16, 2009, 1 page.

Abbreviated Examination Report for GB0819761.8, dated May 9, 2012, 1 pg.

Examination Opinion for GB0819761.8, dated Feb. 17, 2010, 1 pg.

Examination Report for EP09702812.0, dated Jul. 17, 2013, 10 pgs.

Examination Report for EP13166151.4, dated Jul. 18, 2013, 13 pgs.

Examination Report for GB0819761.8, dated Jan. 7, 2013, 2 pgs.

Examination Report for GB0819761.8, dated Sep. 21, 2012, 3 pgs.

Notice of Reasons for Rejection of JP2010-542679, mailing date Feb. 5, 2013, 4 pgs.

* cited by examiner

TEMPORARY SUPPORT

BACKGROUND

This disclosure relates to the temporary support of signs and of other equipment, such as electrical equipment, especially floodlights, above the ground.

There are numerous circumstances where signs or other equipment, especially electrical equipment of different kinds, needs temporarily to be mounted on a support above the ground. Examples include temporary traffic signs or signals, public address speakers at a country show or for a travelling circus, satellite dishes for military communication, emergency lighting for roadworks, and temporary floodlights for emergency workers at the site of an accident or for sporting fixtures played after dark or in poor lighting conditions, especially on public grounds.

While there have been numerous prior proposals for temporary supports for signs and for electrical and other equipment, mostly in the form of mechanically connectable structures, the structures proposed have often suffered from being too complicated to be readily erectable and demountable by a single person unfamiliar with the structure, too bulky when collapsed to be readily transportable, for example in the boot (trunk) of a small car (automobile), or insufficiently stable.

As will become clear from the detailed description below, the present disclosure adopts a different approach.

SUMMARY OF THE INVENTION

In accordance with a first aspect of this disclosure, equipment is adapted to be temporarily supported above the ground by a self-supporting, readily erectable and transportable mast, the mast comprising: a pneumatically inflatable elongate tube having a first end to which the equipment is coupled and a second end coupled to a ground support tripod, and being provided with bracing structure adapted to brace the tube when inflated and including respective flexible members extending from each tripod leg to the first end of the tube.

Preferably the tripod legs are extendable, preferably being telescopic, and are interconnected by bracing struts that may be pushed beyond dead centre to resist unintentional collapse.

It will readily be appreciated that a bracing structure formed of flexible members is non-rigid, and so allows the structure as a whole to be packed away for easy transport when not inflated. The principal rigid components of the structure will be the tripod, which, as noted above preferably has telescopic legs to reduce its packing space requirement, and the equipment to be supported. As will become clear from the detailed description below with reference to the accompanying drawings, this enables (say) a temporary floodlight to be transportable in a conventional shoulder bag for erection where required simply by opening the tripod and inflating the tube.

The flexible members may each comprise a single or multiple ply cord interconnecting each leg, preferably from a mounting point intermediate its ends when extended, to the first end of the tube, preferably with additional connections to one or more collars mounted on the tube at positions intermediate its ends. The additional connections may comprise respective cords extending from the collar to each said flexible elongate member. Alternatively, each such collar may be provided with three spokes, the proximal ends of which are coupled to the collar, and the distal ends of which are coupled to the cord. For each collar, the distal ends of its spokes are preferably connected by three further cords.

When the tube is inflated for use, the cords are each placed under tension, thereby bracing the structure as a whole.

In an alternative arrangement, each flexible member may comprise a respective web of material interconnecting a mounting point intermediate the ends of a leg when extended with the first end and the second end of the tube.

When the tube is inflated for use and the tripod positioned on the ground, each said web is placed under tension between the first end and the mounting point and between the first and second ends, thereby bracing the structure as a whole.

Preferably the tube is flexible when deflated and substantially inflexible when inflated, and includes reinforcing textile strands helically laid between two layers formed from a material selected from rubber, substitutes therefor and plastics, the strands being laid at an angle to the axis of the tubular member of 45°, and more preferably, 30° or less.

Preferred embodiments have one or more of the following features: The said material is PVC. The reinforcing strands are formed of a textile material, preferably nylon. The reinforcing strands are helically wound in opposing senses about the axis of the tubular member so as to cross. The reinforcing strands are laid at an angle of between 10 and 15°. The strands with opposing sense may be interwoven, thereby resulting in a woven textile reinforcing structure. There is a second layer of reinforcing strands laid at a different angle to the first. The first layer of reinforcing strands are laid at an angle of between 10 and 15° and the second layer of strands are laid at an angle of about 45°. There is a further layer of reinforcing strands extending parallel to the axis of the tubular member.

The term "equipment" as used herein is intended to encompass any form of mechanical or electrical equipment desired to be supported at a height above the ground, including flags, static signs, manually movable signs such as a manual Stop/Go board for controlling traffic flow at road works, sports equipment such as a netball goal or basketball net, and electrically operable equipment of diverse kinds, including, in particular, temporary floodlights flags, electrically operable signs, traffic signals, public address loudspeakers, illuminated road signs, beacons, security, safety or speed cameras, satellite dishes, and television cameras.

BRIEF DESCRIPTION OF THE DRAWINGS

Embodiments of equipment adapted for temporary support above the ground are hereinafter more particularly described by way of example only with reference to the accompanying drawings, in which.

DESCRIPTION OF PREFERRED EMBODIMENTS

Figure 1:
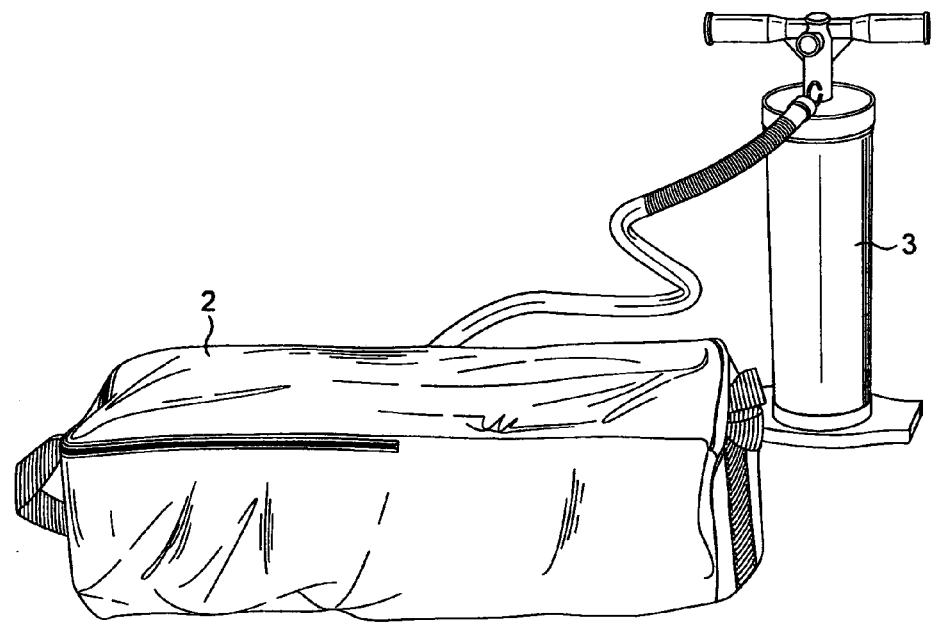
FIG. 1 shows a bag for transporting equipment and mast, and also a hand operable pneumatic pump.
Figure 2:
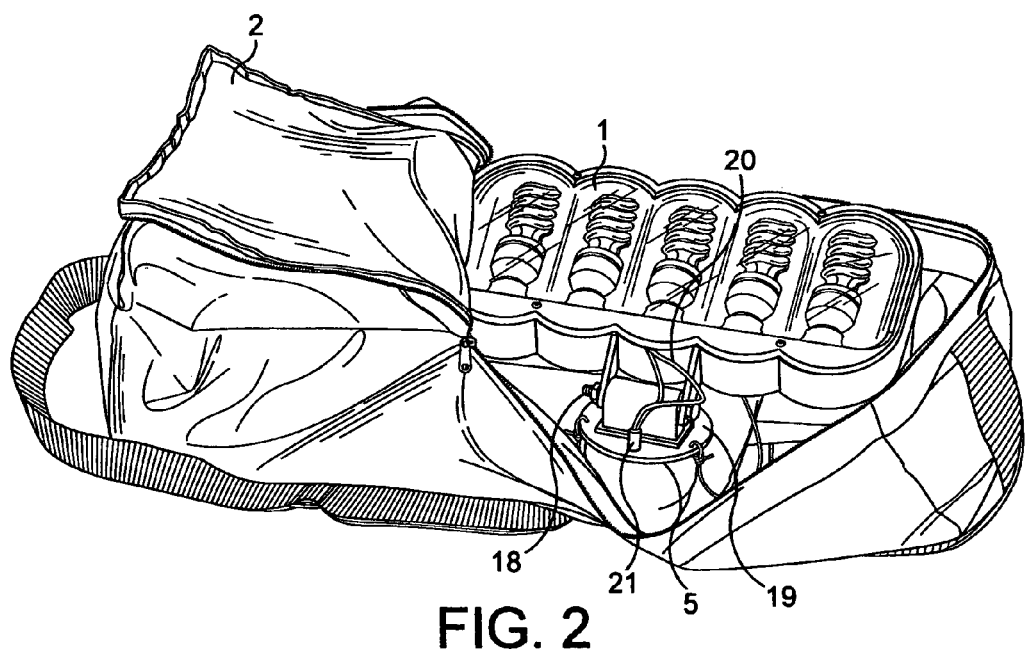
FIG. 2 shows the bag of FIG. 1 opened to reveal the equipment, here a temporary floodlight.

As will be apparent from FIGS. 1 and 2, electrical equipment, here a temporary floodlight 1, and a mast for supporting the floodlight, as described in more detail herinbelow, are readily transportable by a single person in a shoulder bag 2, and need only a simple manually operable pump, here a stirrup pump 3, for erection of the mast on site for temporary support of the electrical equipment above the ground.

Figure 5:
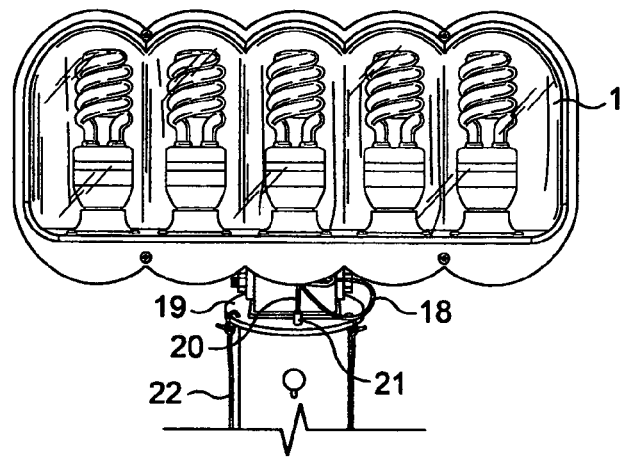
FIG. 5 shows the equipment and one end of the tube on an enlarged scale.

A pneumatically inflatable elongate tube 4, shown before inflation in FIG. 3, has a first end 5 coupled to the floodlight, as best shown in FIGS. 2 and 5, and a second end 6 coupled to a tripod 7, which is shown with its legs 8 unfolded in FIG. 3, but before extending the legs. In this arrangement the legs are telescopic, comprising a first leg member 9, the proximal end of which is pivoted at 10 to a tripod centre member 11 which is coupled to the second end 6 of the tube, and a second leg member 12 which is telescopically slidable within the first leg member 9 and clampable thereto when extended. The distal ends 13 of the first leg members are connected by struts 14 pivoted to ends 13 and also to a central member 15. The interlinked struts can be pushed beyond dead centre to brace the tripod against unintentional collapse.

Figure 3:
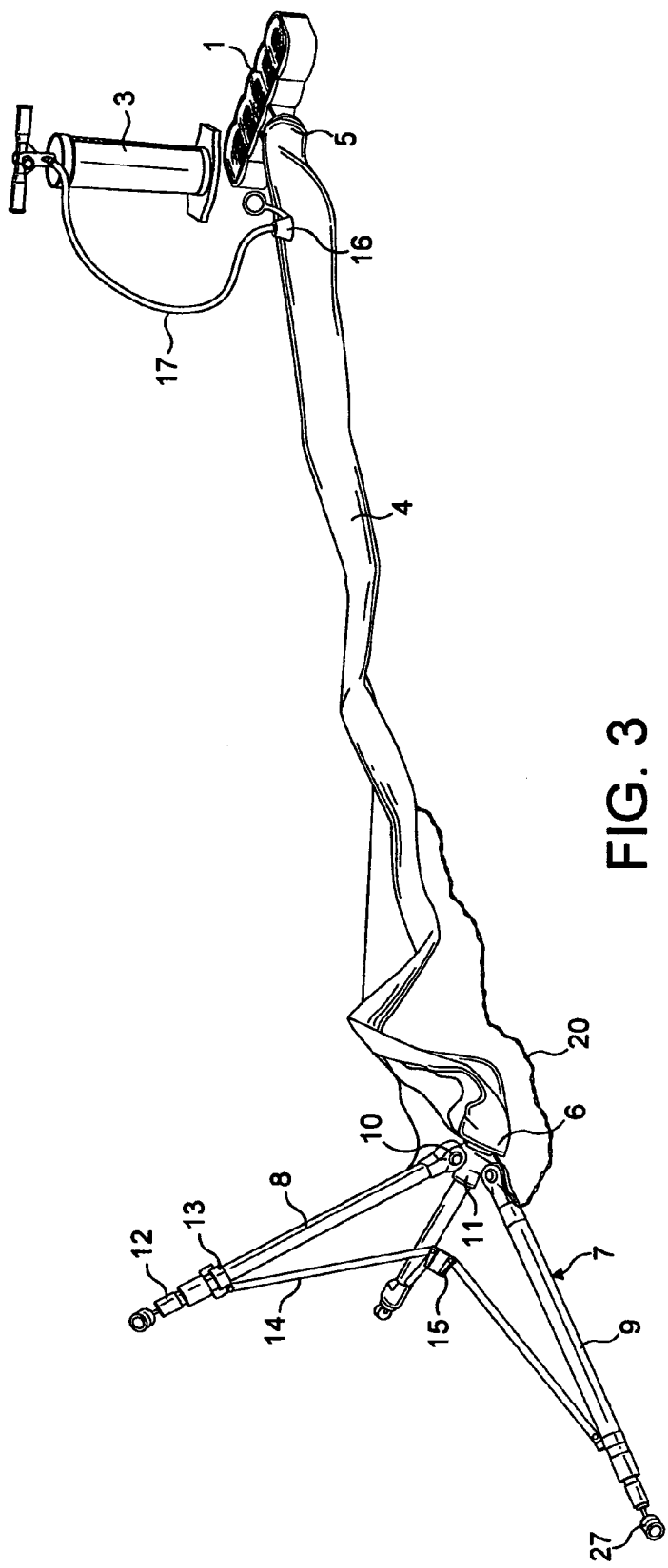
FIG. 3 shows the equipment and mast removed from the bag and coupled to the pump for inflation of an elongate tube.
Figure 4:
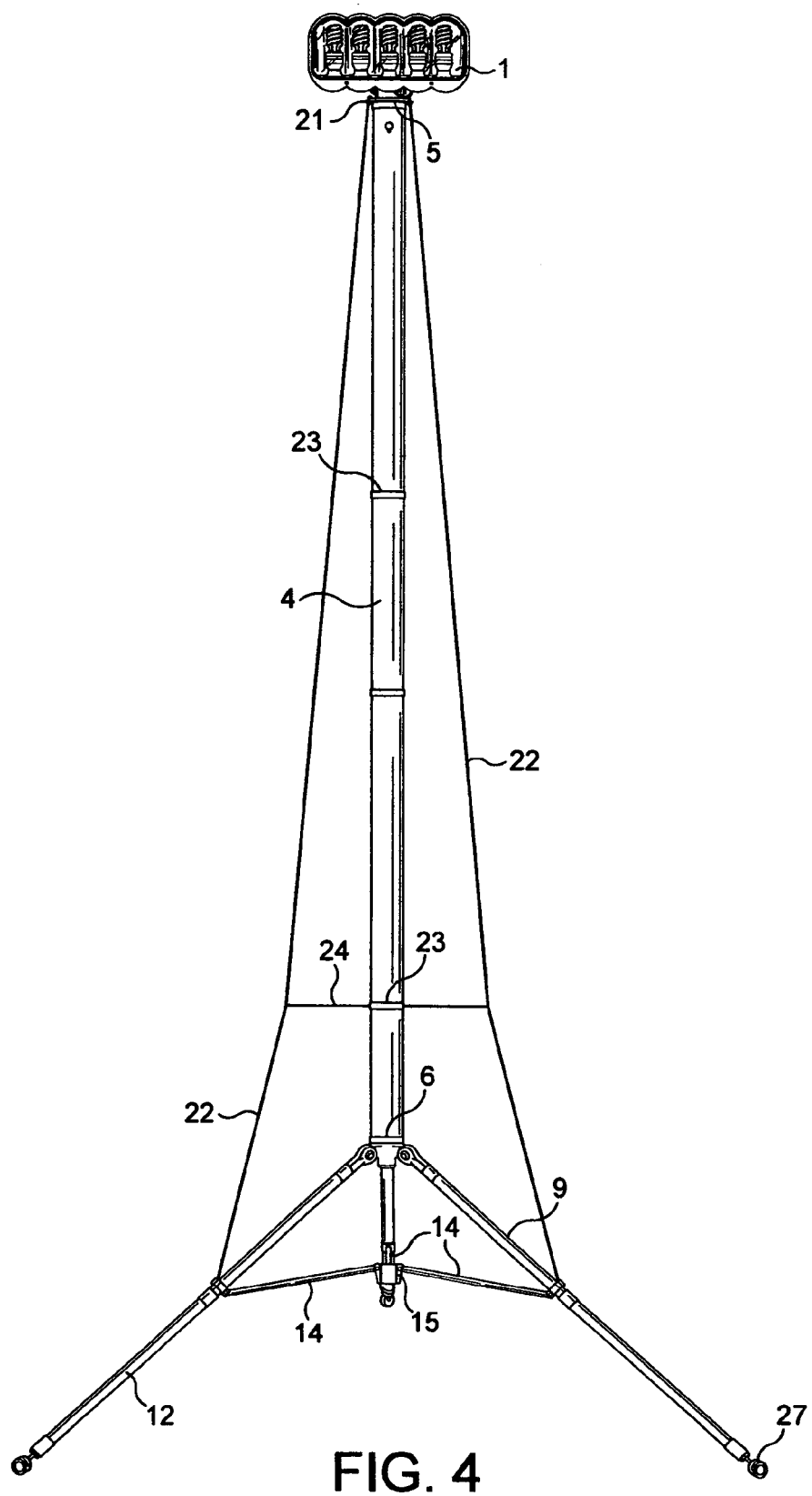
FIG. 4 shows the equipment supported by the erected mast.

A valve 16 is provided for coupling to a pneumatic line 17 connected to pump 3. An electrically operable pump, for example run from a cigar lighter socket in a car (automobile) may be used in place of a manually operable pump. Valve 16 is preferably placed near to the first end of tube 4 so that the mast may only be inflated or deflated when lying on the ground in a substantially horizontal position (FIG. 3). This avoids the possible problem of electrical equipment falling on someone as the mast is deflated. After inflation of the tube, the mast can be moved to a substantially vertical position to support the equipment (FIG. 4).

As can be seen from FIGS. 2 and 5, floodlight assembly 1 is mounted on a bracket 18 so as to be angularly adjustable, bracket 18 being mounted on a mounting member 19 closing the first end 5 of the tube. Electrical wiring 20 for the floodlight assembly 1 passes through an air-tight grommet 21 into the interior of tube 4 and exits at the second end 6 of the tube 4, as best shown in FIG. 3, through a similar grommet (not shown).

Elongate flexible members, here in the form of guide lines 22 interconnect the distal ends of the first leg members with the mounting member 19 at the first end 5 of the tube. The guide lines 22 are pre-connected to the tube and tripod legs prior to inflation of the tube (FIG. 3), and when the tube 4 is adequately inflated (FIG. 4), the guide lines 22 are placed under tension. Guide lines 22 may be formed from single or multiple ply cords. Additional bracing cooperating with the guide lines 22 may be provided as shown in FIG. 4. Tube 4 is shown mounting several collars 23 along its length. Here illustrated only for one such collar, elastic cords 24 are coupled between the guide lines 22 and the collar 23. It will be understood that similar elastic cords may be provided for the other collars 23.

Figure 6:
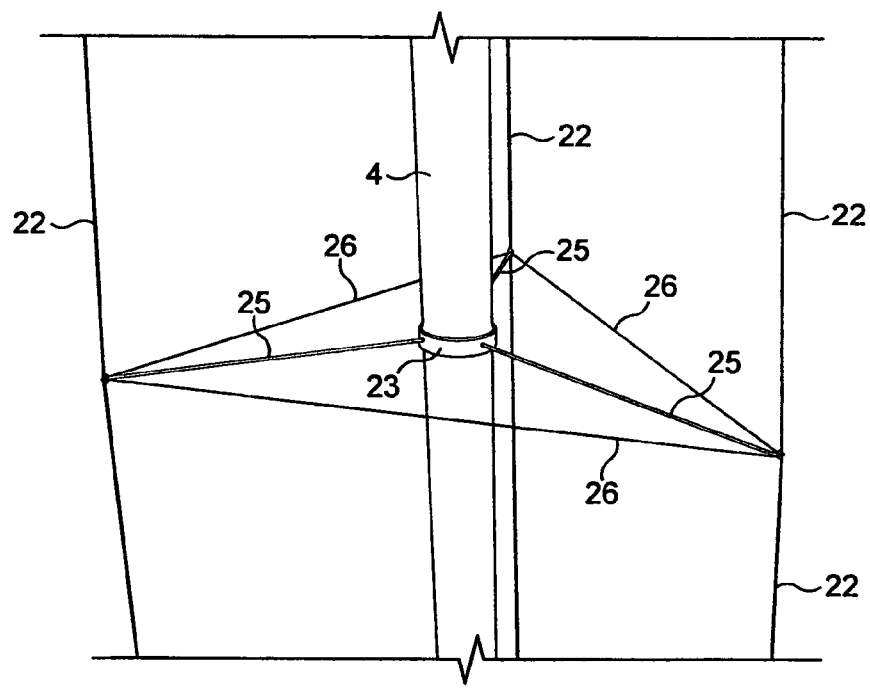
FIG. 6 shows an alternative intermediate bracing structure coupled to a collar on the tube.

An alternative intermediate bracing structure cooperating with guide lines 22 is shown in FIG. 6. In this embodiment, a collar 23 mounts three spokes 25, the distal end of each spoke being coupled to a respective guide line 22. The spoke distal ends are also preferably interconnected by cords 26.

Figure 7:
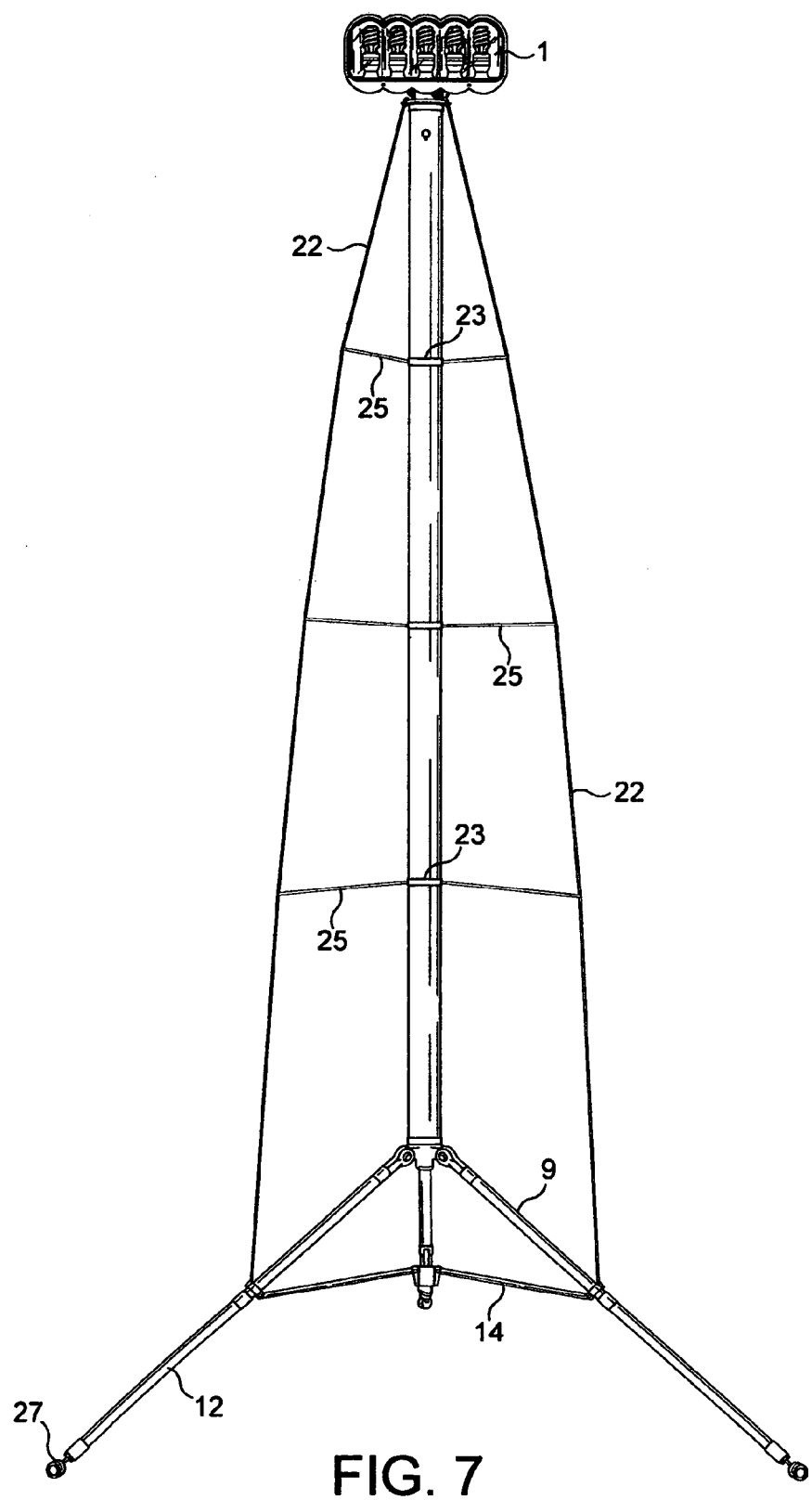
FIG. 7 is a view similar to FIG. 4 with a bracing structure including a variation of the intermediate structures shown in FIG. 6.
Figure 8:
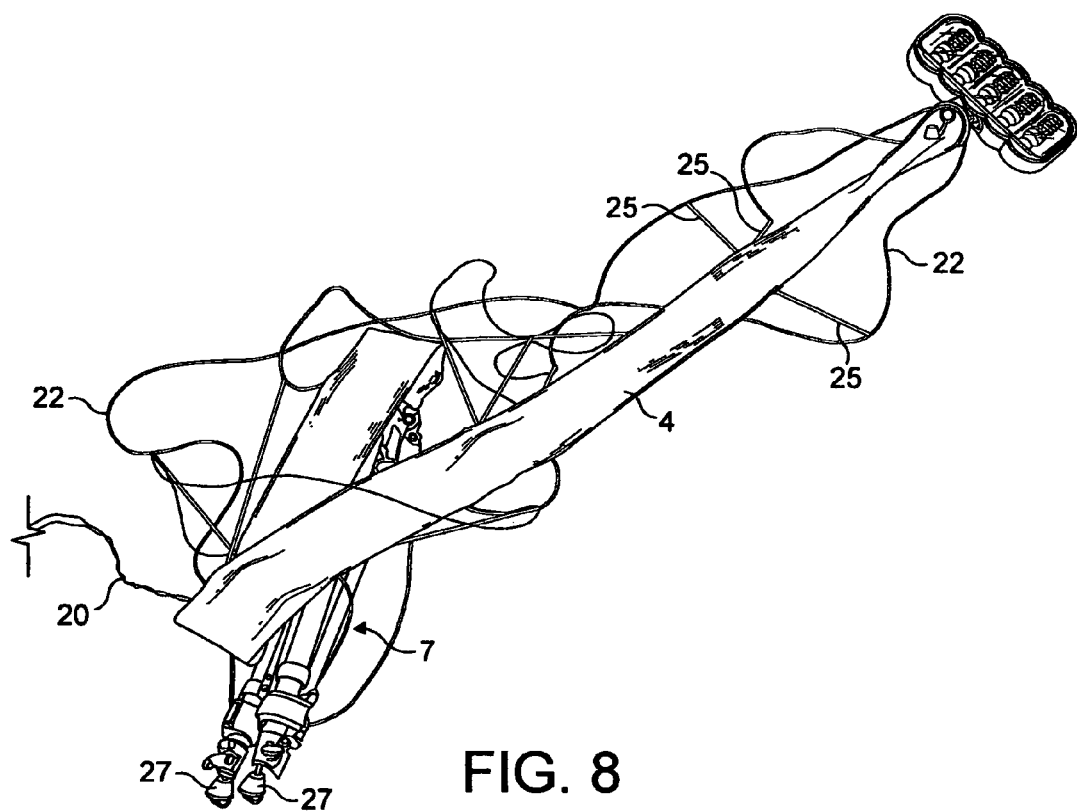
FIG. 8 shows the equipment and mast of FIG. 7 collapsed ready for packing away in a bag.

FIG. 7 shows an alternative embodiment of electrical equipment and supporting mast, employing additional bracing structures with spokes 25 as in FIG. 6, but without the additional cords 26. As can be seen from FIG. 8, even structure such as that of FIG. 7 will readily collapse for packing away for transport.

Tripod 7 may be provided with castors 27 so that the erected mast and equipment may be wheeled into position. The castors are preferably lockable.

Since the electrical equipment and mast may be packed away in a shoulder bag for ready transport, and may be erected on site simply by opening the tripod and inflating the tube, transport, erection and taking down can all be performed by a single person without any tools other than a simple pneumatic pump, and without any assembly or disassembly of mechanical parts.

Figure 9:
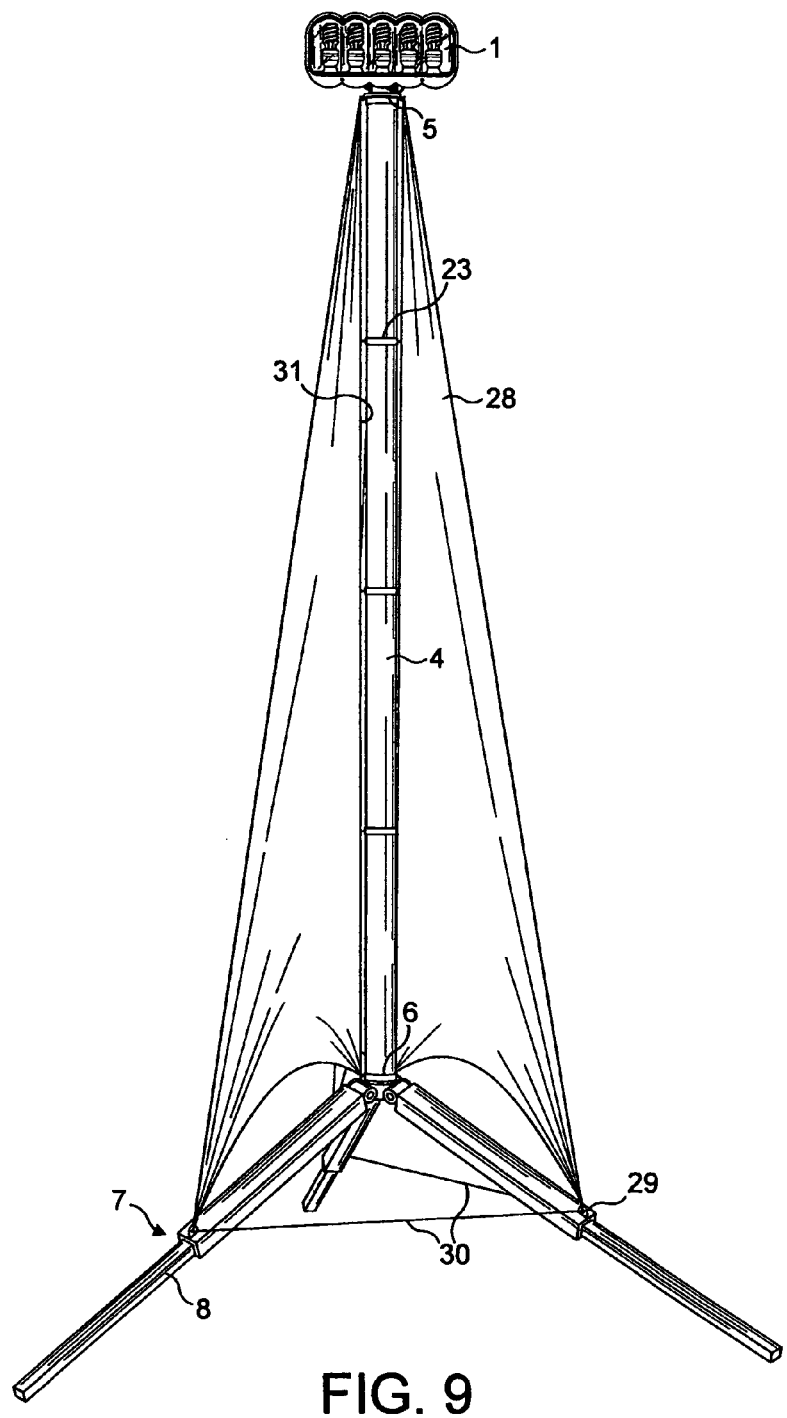
FIG. 9 is a view similar to FIG. 4 with an alternative web-based bracing structure.
Figure 10:
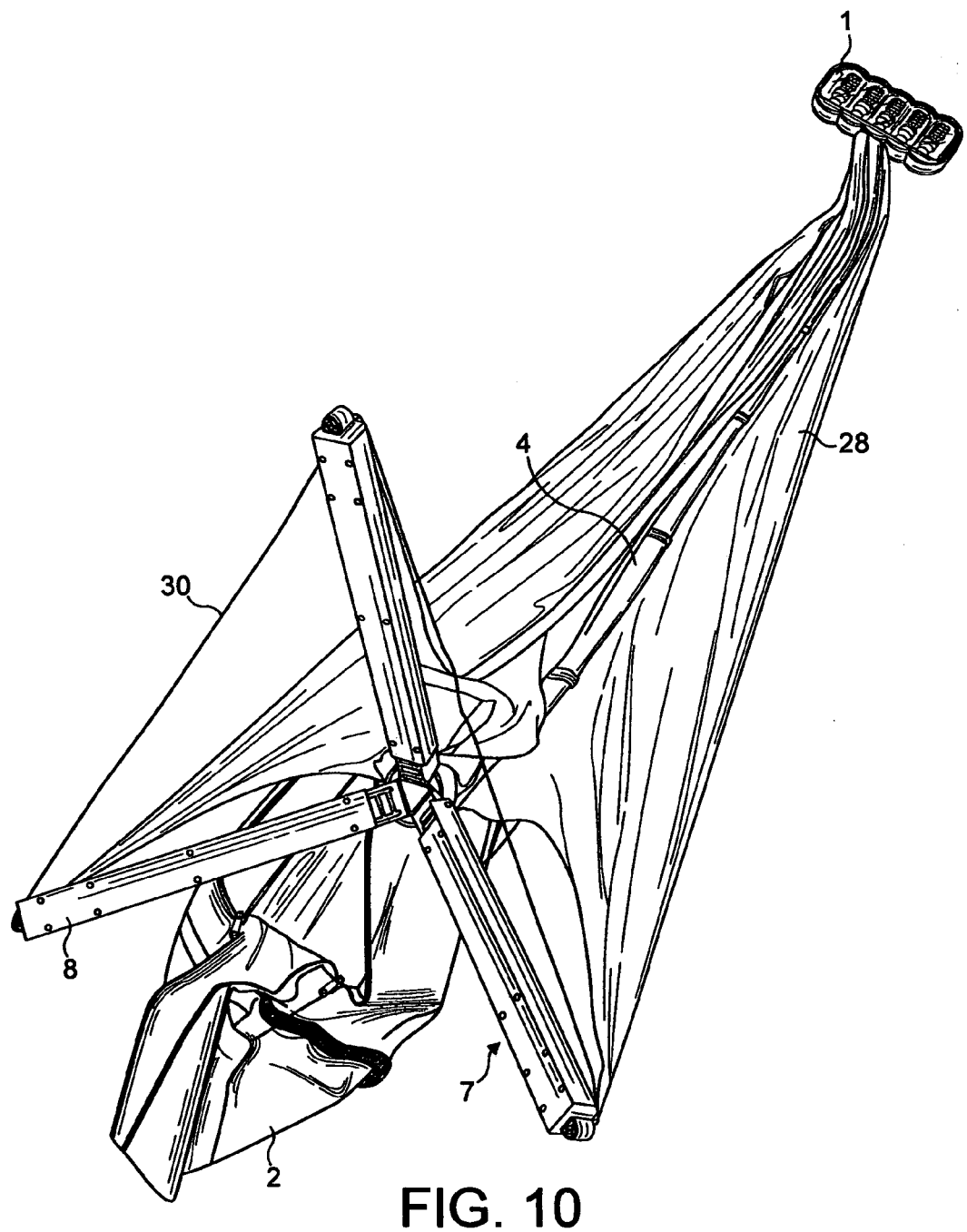
FIG. 10 shows the structure of FIG. 9 partially collapsed for packing away into its bag.
Figure 11:
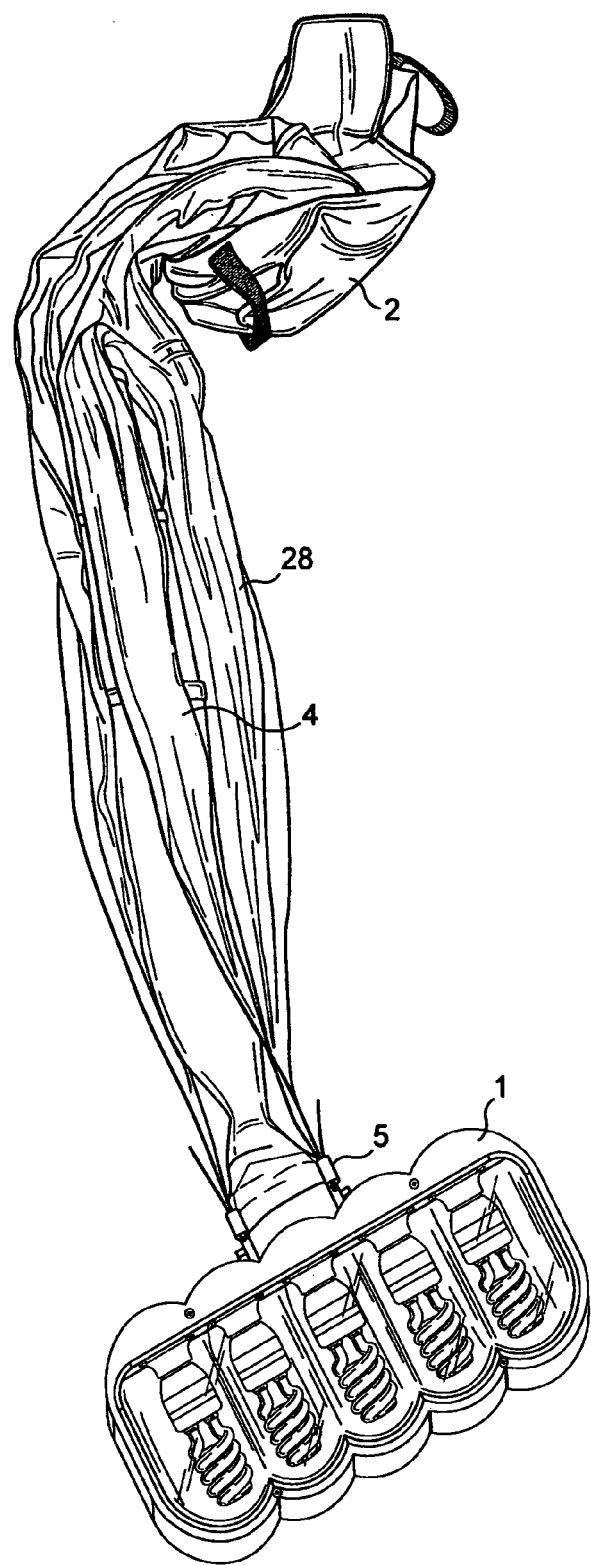
FIG. 11 shows the structure of FIG. 9 in the course of being so packed away.

Other arrangements are feasible. Thus, as illustrated in FIGS. 9 to 11, it is not necessary for the tube bracing structure to be provided by guide lines. Here respective flexible webs 28 interconnect mounting points 29 on the legs 8 with both the first 5 and second 6 ends of the tube. When the tube is inflated and erect on the tripod 7, the respective webs 28 are in tension between their mounting point 29 and the first end and between the first and second ends. Flexible cords 30 are here shown interconnecting the mounting points 29. We have found that the illustrated structure remains stable even in a moderate wind. To reduce any tendency for the webs 28 to act as sails, they may include apertures (not shown) to allow air to pass through the webs. The webs may be connected along their inner edges 31 adjacent the tube 4 to collars 23 spaced along the tube.

Figure 12:
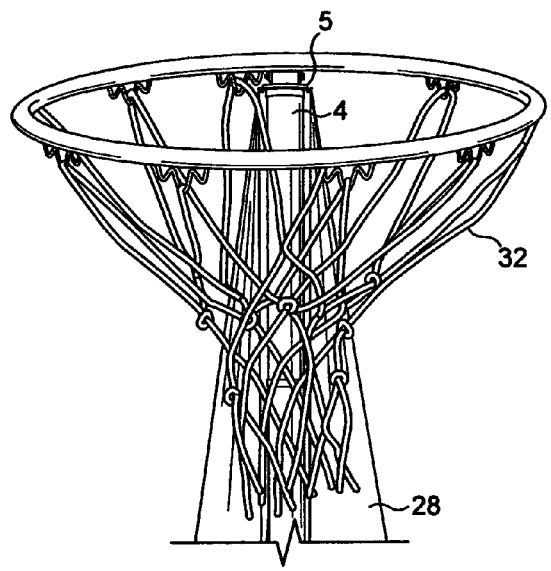
FIGS. 12 to 15 show different forms of equipment mounted to the first end of a tube in a structure as shown in FIG. 9.
Figure 13:
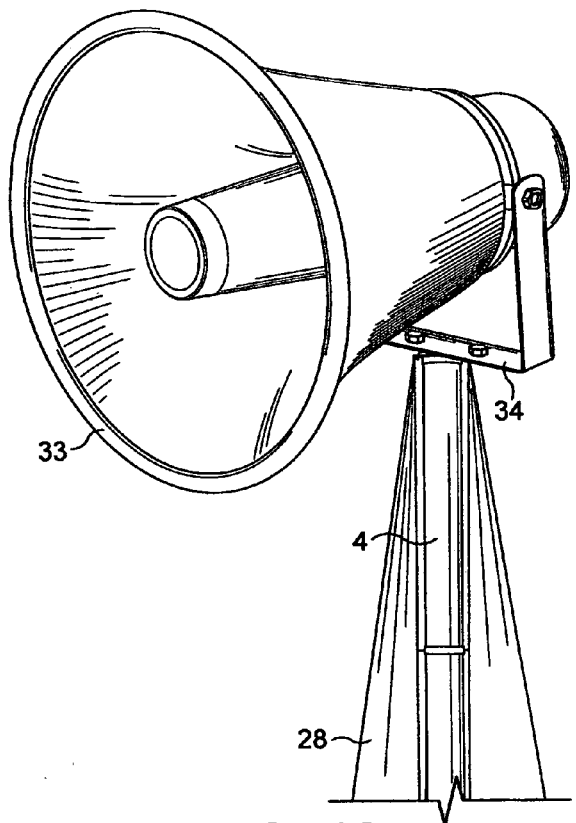
Figure 14:
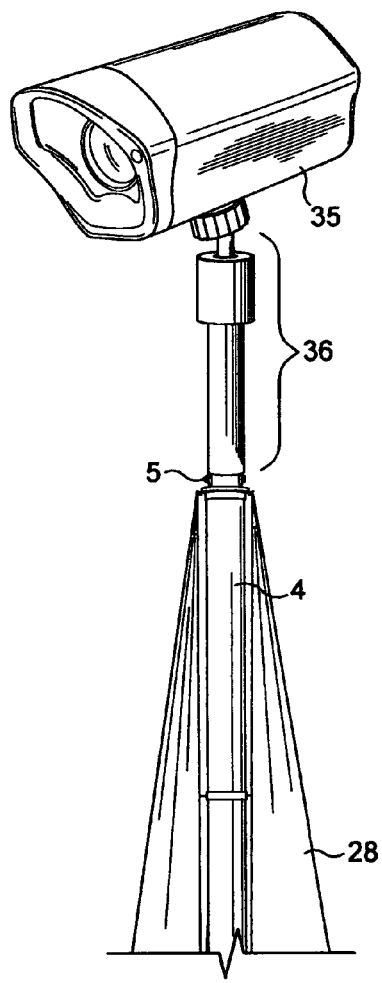
Figure 15:
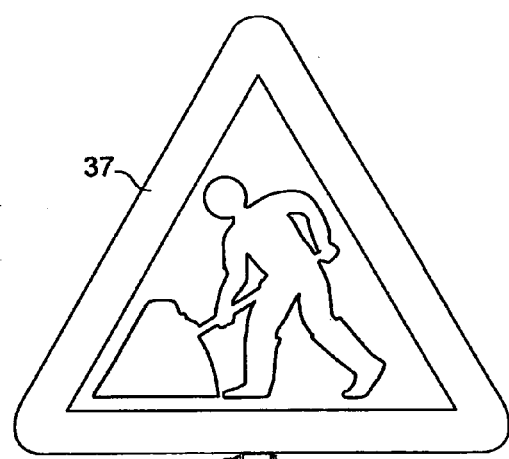
Figure 15:
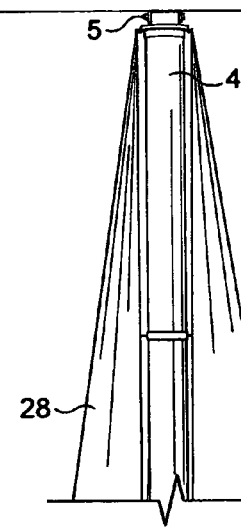

While the embodiments illustrated in FIGS. 1 to 11 include electrical equipment in the form of a floodlight, persons of ordinary skill will readily appreciate that similar masts may be employed to mount other forms of equipment that it is desired to temporarily support above the ground, such as, without limitation, public address speakers, temporary traffic signals or illuminated road signs, security, safety or speed cameras, or communication equipment such as satellite dishes, or even equipment that is not electrical, such as, without limitation, basketball or netball nets, or signs that do not require illumination. FIG. 12 shows a netball goal 32 mounted to a first end of a tube in a structure otherwise as shown in FIG. 9. FIG. 13 shows a public address loudspeaker 33 mounted by a swivel bracket 34 to a first end of a tube in a structure otherwise as shown in FIG. 9. FIG. 14 shows a close circuit television camera 35, for example a security camera or a speed camera, coupled by an adjustable mount 36 to a first end of a tube in a structure otherwise as shown in FIG. 9. FIG. 15 shows a static warning sign 37 mounted to a first end of a tube in a structure otherwise as shown in FIG. 9.

The elongate tube 4 may be formed from a similar material to that described in our co-pending British Patent Application No: 0501474.1 (published as GB 2422322 A) for use in providing inflatable sports goals. The material suggested in GB 2422322 for forming the tubular struts was natural or synthetic rubber, or plastics substitutes, preferably reinforced with nylon thread. Commercial embodiments of sports goals have since been produced and sold under our Registered Community Trademark igoal®, and are formed with a thickness in the material of the struts of around 2 mm, and a diameter for the goalposts and cross-bar of 3 inches (7.62 cm), and work well when inflated with an applied pressure of around 1 Bar. The tubular members employ inner and outer layers of soft polyvinylchloride (PVC) with nylon threads between the two layers helically wound in opposing senses about the axis of the tube so as to cross, being laid typically with an angle to the axis of 80° or more. The two plastics layers are softened to fuse together in the interstices between the nylon threads. We have found that this structure prevents the tube from ballooning (expanding diametrically) in use. An additional layer of parallel threads preferably runs along the length of the tubular member to prevent stretching lengthwise in use.

Elongate tubes formed in the same way work well with the structures described in the present Specification. However, as explained below, and as described and illustrated in our co-pending Patent Application No: 0819761.8 (not yet published at the date of filing of the present Application), we have found that improved results can be achieved with alternative tubular structures.

Figure 16:
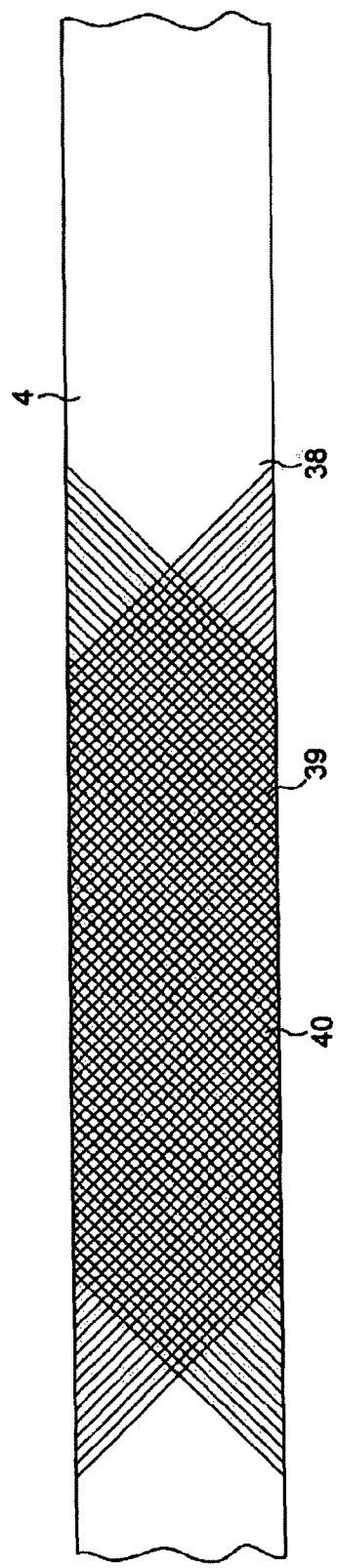
FIG. 16 shows a somewhat schematic and incomplete side elevational view of a tube with reinforcing strands wound at 45°.

In FIG. 16, tube 4 comprises a layer 38 of plastics, suitably a relatively soft plastics material such as PVC, or rubber, overlaid with reinforcing strands 39. The strands 39 comprise a textile material, preferably nylon. In FIG. 16, the strands 39 are wound helically about layer 38 in opposing senses at an angle of 45° to the axis of the tubular member. The opposing sense strands may be interwoven, forming a woven textile reinforcing structure 40.

Figure 17:
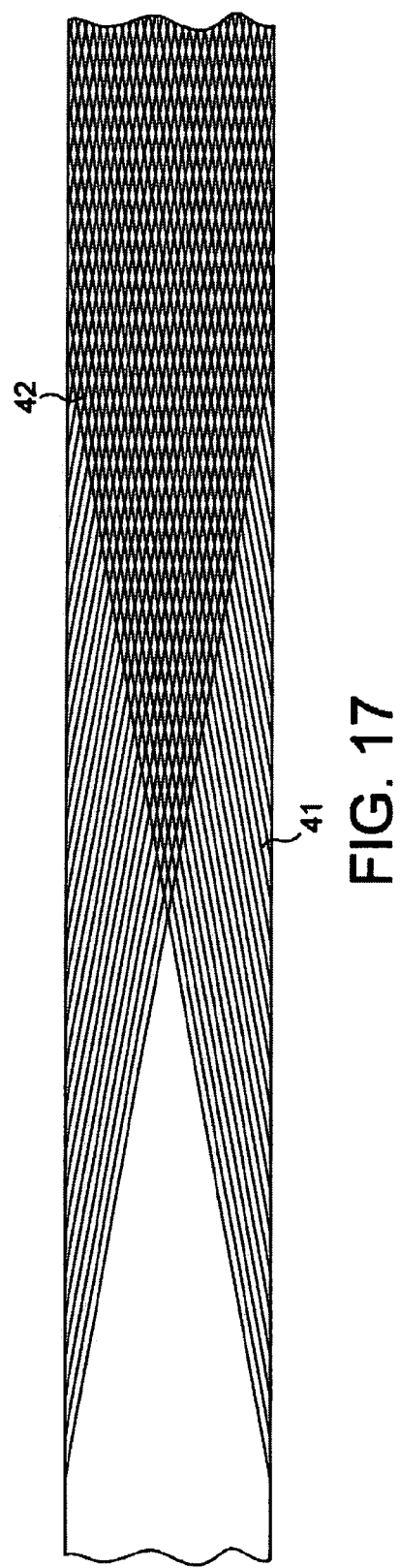
FIG. 17 shows a similar side elevational view of a tube with reinforcing strands wound at 10°.

In FIG. 17, similar reinforcing strands 41 are laid at an angle of 10°, again in opposing senses, the opposing sense strands being interwoven, thereby resulting in a woven textile reinforcing structure 42. Our experiments have shown that a tube 4 as illustrated in FIG. 17 would be substantially more rigid when inflated to the same operating pressure than a structure as shown in FIG. 16, which is already an improvement on the structure described in GB 2422322 and that a significantly improved rigidity can already be detected at an angle reduced from the 45° angle of FIG. 17 to about 30°.

Figure 18:
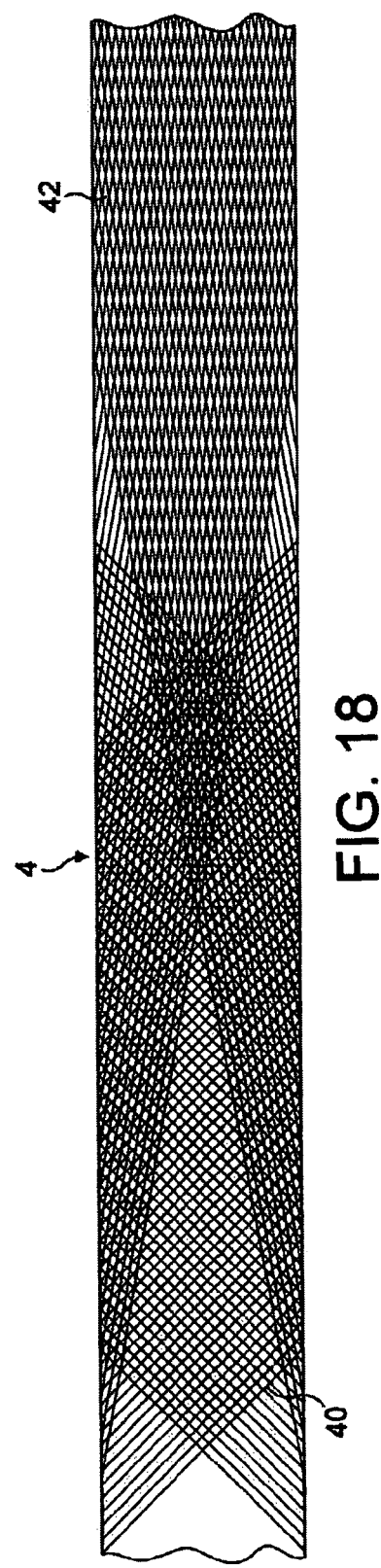
FIG. 18 shows a similar side elevational view of a tube with reinforcing strands wound as in both FIG. 16 and FIG. 17.
Figure 19:
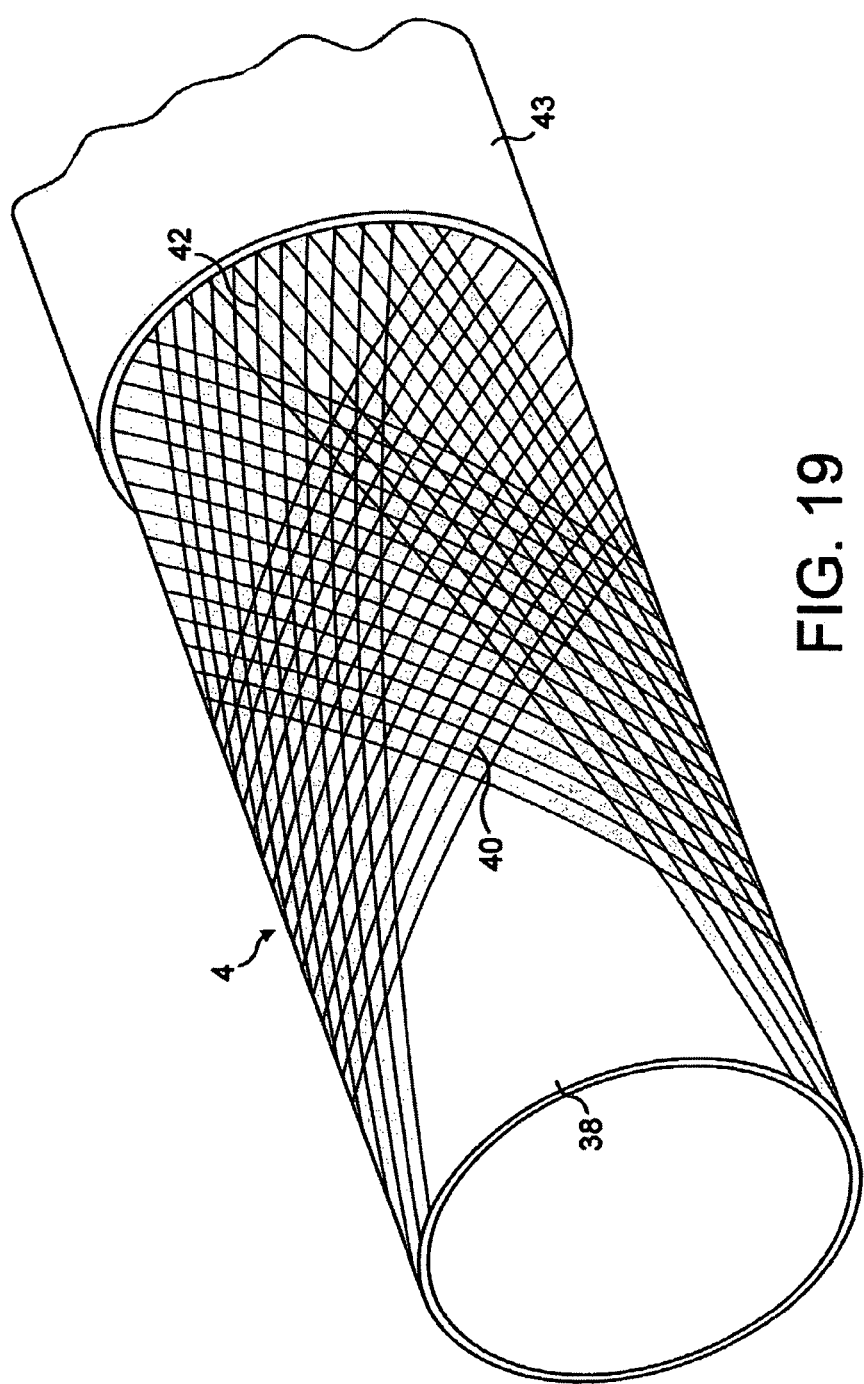
FIG. 19 is perspective view of a length of the tube of FIG. 18 with the strands shown between two plastics layers, one shown partly cut away to show the strands.

FIGS. 18 and 19 show a preferred structure with two superposed reinforcing layers comprising the woven textile reinforcing structures 40 and 42.

It will be understood that in each of FIGS. 16 to 19, the reinforcing structures are shown incomplete for the purpose of illustration and explanation, and that in practice the reinforcing structures would extend along the entire length of the tube 4.

As best shown in FIG. 19, a second layer 43 of plastics, suitably a relatively soft plastics material such as PVC, or rubber overlies the reinforcing structures. As can be seen from the drawings, the textile strands are spaced so that, even with two superposed reinforcing structures, as in FIGS. 18 and 19, there are interstices between the strands. During application of the second layer 43, or subsequently thereto, the two layers 38 and 42 are warmed sufficiently to fuse together through the interstices of the reinforcing layers.

Figure 20:
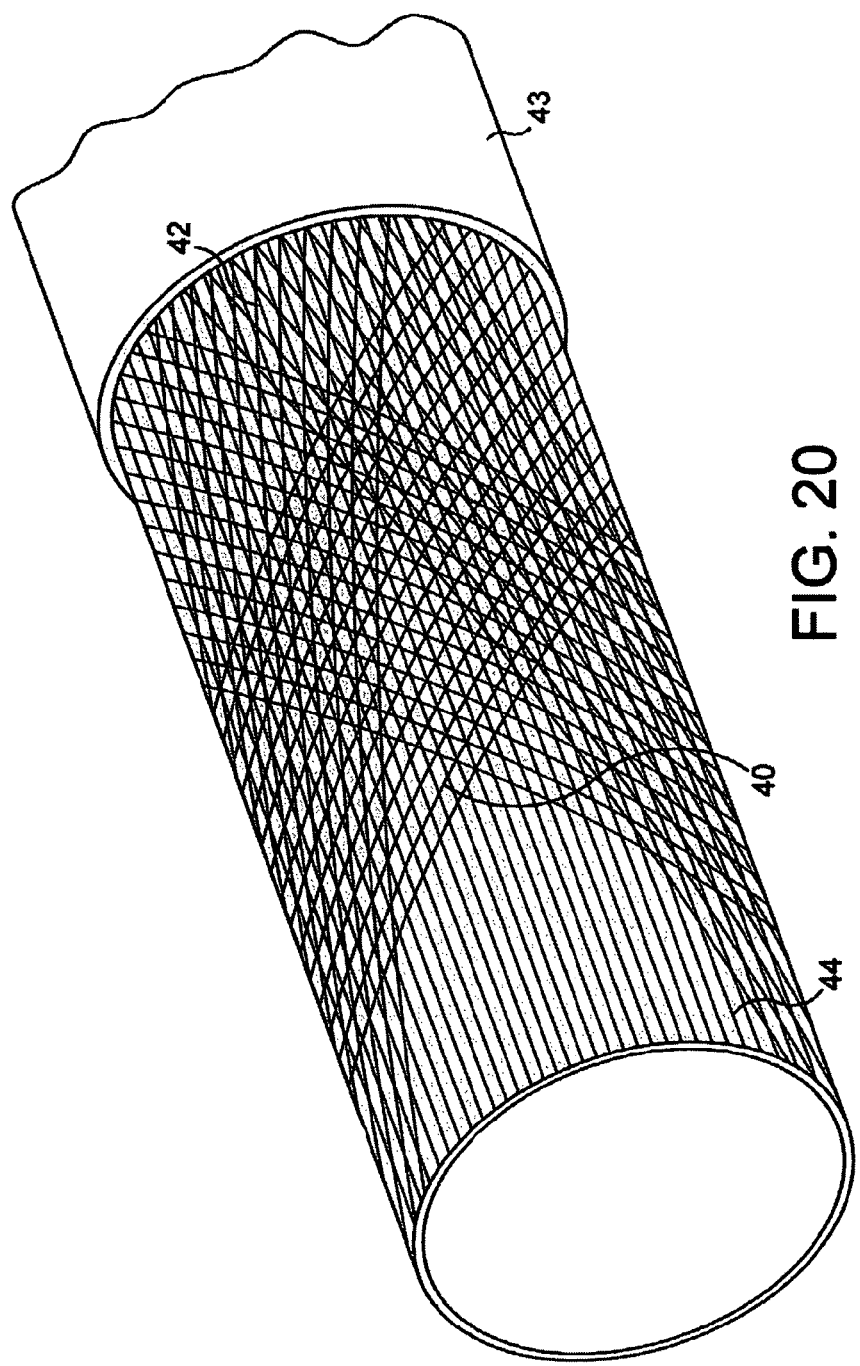
FIG. 20 is a perspective view similar to FIG. 19 for a tube with a further layer of reinforcing strands parallel to the axis of the tube.

FIG. 20 shows a variation on the structure of FIGS. 18 and 19, in which a further layer of reinforcing strands 44 is employed, the strands, in this case, extending parallel to the axis of the tubular member. These strands help to prevent the tube 4 stretching lengthwise.

For most purposes contemplated by the present invention, we find that a tube 4, as shown in FIGS. 18 and 19 or in FIG. 20, having a diameter of 3 inches (7.62 cm) when inflated to a typical inflation pressure of around 1 Bar, namely between 10 and 20 psi (6.89 to $13.79*10^4$ pascals), realisable with a foot pump or with an inexpensive tyre pressure pump operating from the cigar lighter socket of a vehicle, and an overall thickness of 2 mm, works well. The textile strands are preferably in the form of thin textile thread. The textile thread may comprise conventional nylon sewing thread. It will be understood, however, that different diameters and thicknesses may be chosen. The tube 4 when deflated is readily flexible, allowing the temporary structure to be packed away and to be portable.

The adoption of tubes 4, especially as shown in FIGS. 18 and 19, which possess enhanced rigidity when inflated, raises the prospect of providing masts for equipment to be mounted aloft as described above, where the mast is significantly taller than heretofore, or where the bracing structure is reduced.

The invention claimed is:

1. A kit comprising:
   (1) a self-supporting, readily erectable and transportable mast adapted temporarily to support equipment above the ground, the mast comprising:
      (a) a pneumatically inflatable elongate tube having a first end to which the equipment is arranged to be coupled and a second end, wherein the tube is flexible when deflated in order to be collapsed for transport and substantially inflexible when inflated in order to support the equipment above the ground, and wherein the first end of the tube defines an opening and a mounting member is positioned at the first end of the tube closing off the opening;
      (b) a collapsible ground support tripod coupled to the second end of the tube, the tripod having three pivotable tripod legs, and
      (c) a bracing structure adapted to brace the tube when inflated, wherein the bracing structure includes three flexible members extending from the tripod legs to the first end of the tube, wherein each of the flexible members includes a first end connected to the tube and a second end connected to the corresponding tripod leg, and wherein the flexible members are pre-connected to the tube and the tripod legs prior to inflation of the tube;
   (2) a single shoulder bag containing the mast with the tube deflated, the tripod collapsed and the flexible members connected to the tube and the tripod legs, whereby the shoulder bag allows for transport of the mast by one person; and
   (3) a portable pump engageable with the tube to provide for inflation of the tube; wherein, following removal from the shoulder bag, the tube is configured to be inflated along a ground surface while in a substantially horizontal position and thereafter moved to a substantially vertical position following inflation to support the equipment.

2. The kit according to claim 1, wherein the tripod legs are extendable.

3. The kit according to claim 2, wherein the tripod legs are telescopic, and are interconnected by bracing struts connected together by a central member, wherein the bracing struts each include an end attached to the central member and an opposite end attached to one of the tripod legs.

4. The kit according to claim 1, wherein the flexible members each comprise a single or multiple ply cord interconnecting each leg to the first end of the tube with additional connections to one or more collars mounted on the tube at positions intermediate the first and second ends of the tube.

5. The kit according to claim 4, wherein the additional connections comprise respective cords extending from the collar to each said flexible elongate member.

6. The kit according to claim 4, wherein each collar is provided with a plurality of spokes each having a proximal end and a distal end, wherein the proximal ends of the spokes are coupled to the collar, and the distal ends of the spokes are coupled to the respective cord.

7. The kit according to claim 6, wherein, for each collar, the distal ends of its spokes are connected by further cords.

8. The kit according to claim 1, wherein each flexible member comprises a respective web of material interconnecting a mounting point on a respective said leg with the first end and the second end of the tube, the web of material being placed under tension between the first end and the mounting point and between the first and second ends when the tripod is erected and the tube is inflated.

9. The kit according to claim 1, wherein the tube includes an air-impermeable tube wall formed from reinforcing textile strands helically laid between two layers formed from a material selected from rubber, substitutes therefor and plastics, the strands being laid at an angle to the axis of the tube of 45° or less, and more preferably, 30° or less.

10. The kit according to claim 9, wherein the said material is PVC and the reinforcing strands are formed of nylon.

11. The kit according to claim 9, wherein the reinforcing strands are helically wound in opposing senses about the axis of the tubular member so as to cross.

12. The kit according to claim 11, wherein the strands wound in opposing senses are interwoven resulting in a woven textile reinforcing structure.

13. The kit according to claim 9, wherein the reinforcing strands are laid at an angle of between 10 and 15°.

14. The kit according to claim 9, wherein there is a second layer of reinforcing strands laid at a different angle to the first.

15. The kit according to claim 14, wherein a first layer of reinforcing strands are laid at an angle of between 10 and 15° and a second layer of strands are laid at an angle of about 45°.

16. The kit according to claim 14, wherein there is a further layer of reinforcing strands extending parallel to the axis of the tubular member.

17. The kit according to claim 9, wherein the two layers are fused together through interstices occurring in the strands.

18. The kit according to claim 1, wherein the tube includes an inflation valve positioned at or near the first end of the tube.

19. The kit according to claim 1, wherein the pump is a manually-operated pump.

20. The kit according to claim 1, wherein the tube is configured to support the equipment upon inflation to a pressure of about 1 Bar.

* * * * *